United States Patent [19]
Gianfranco

[11] Patent Number: 5,494,384
[45] Date of Patent: Feb. 27, 1996

[54] APPARATUS FOR TRACING AND MILLING MIXED RADII ARCHES

[75] Inventor: Pozzo Gianfranco, Udine, Italy

[73] Assignee: Freud USA, Inc., High Point, N.C.

[21] Appl. No.: 310,269

[22] Filed: Sep. 21, 1994

[30] Foreign Application Priority Data

Sep. 23, 1993 [IT] Italy .................................. UD93A0191

[51] Int. Cl.$^6$ ...................................................... B23C 3/00
[52] U.S. Cl. ..................... 409/182; 33/27.03; 144/134 D; 144/136 C; 144/137; 409/179
[58] Field of Search ......................... 33/26, 27.01, 27.03, 33/27.06; 409/175, 179, 181, 182; 144/134 D, 136 C, 137, 139

[56] References Cited

U.S. PATENT DOCUMENTS

| | | | |
|---|---|---|---|
| 2,017,430 | 10/1935 | Anderson | 33/27.03 |
| 2,548,302 | 4/1951 | Gilson | 33/26 |
| 2,596,868 | 5/1952 | Richards, Jr. | 409/175 |
| 3,547,424 | 12/1970 | Brown | 33/27.03 |
| 4,306,598 | 12/1981 | Peot | 144/136 C |
| 4,798,506 | 1/1989 | Kulp, Jr. | 409/179 |

Primary Examiner—Daniel W. Howell
Attorney, Agent, or Firm—Shefte, Pinckney & Sawyer

[57] ABSTRACT

An apparatus for defining arcs of mixed radii on a workpiece includes a base, a first selectively extensible arm rotatably mounted to the base, and a second selectively extensible arm rotatably mounted to the first arm. An assembly for defining the arm on the workpiece is mounted to the second arm. An assembly is provided for releasably retaining the first arm at a first disposition for selective movement of the arc defining assembly through a first predetermined angular displacement to define a first arc with a first predetermined radius and to retain the second arm at a second predetermined position for selective movement of the arc defining assembly through a second predetermined angular displacement to define a second arc having a second predetermined radius.

14 Claims, 10 Drawing Sheets

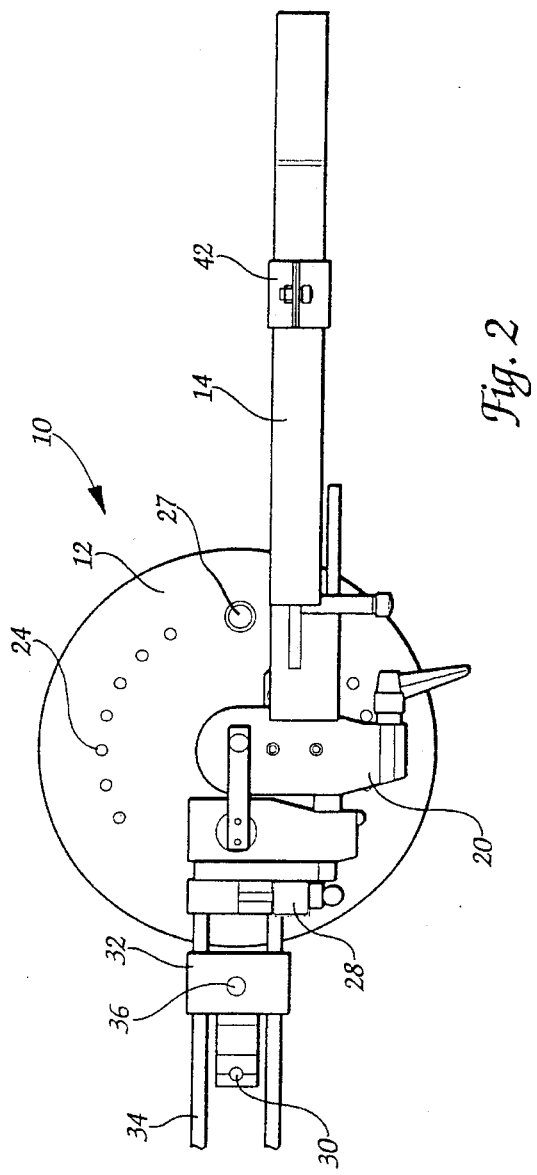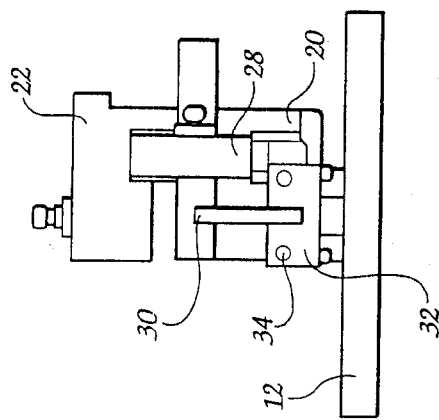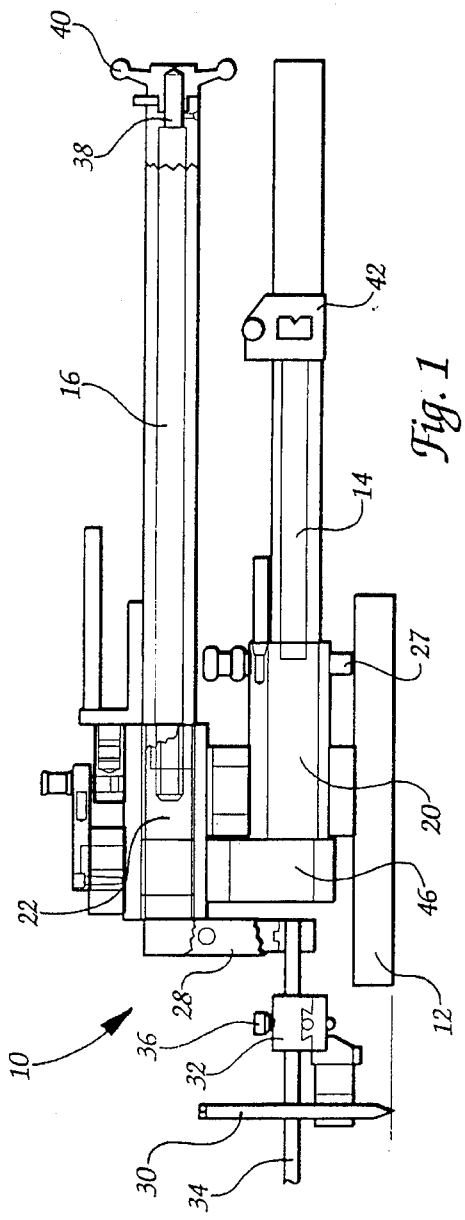

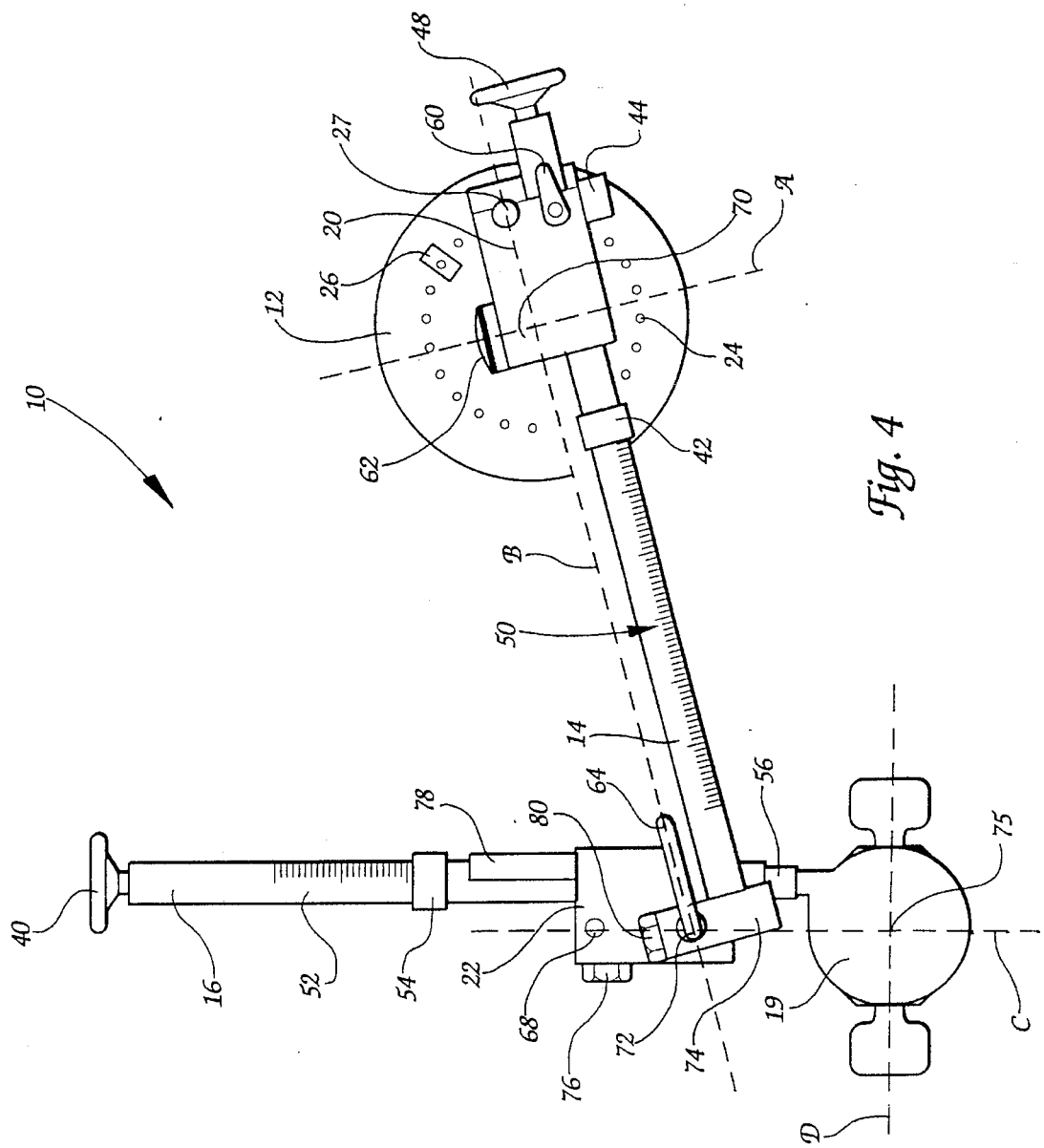

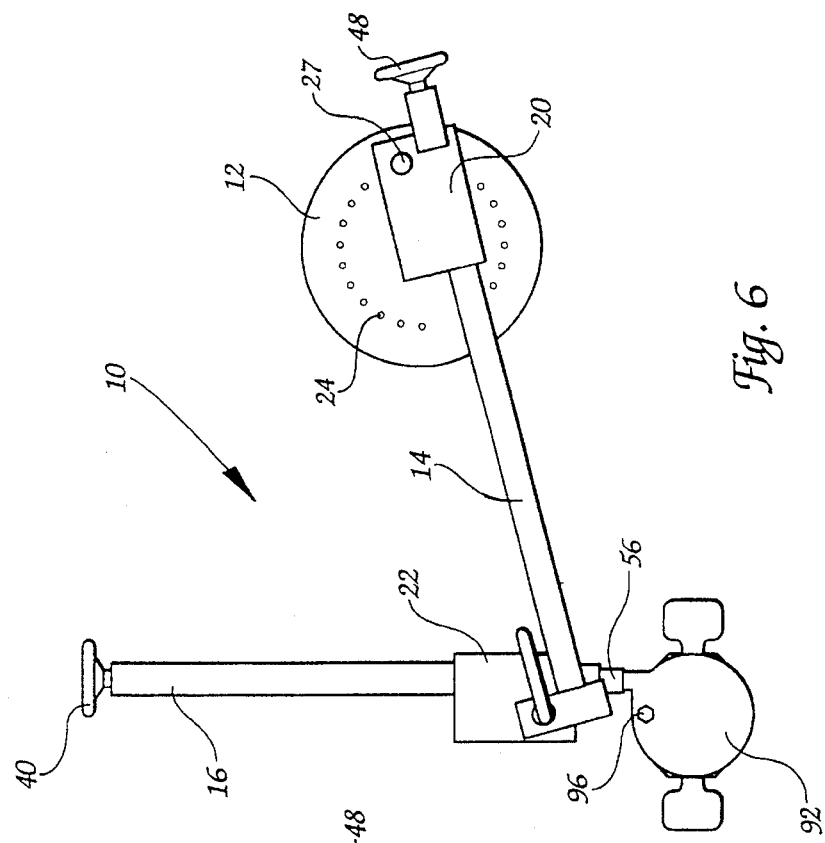
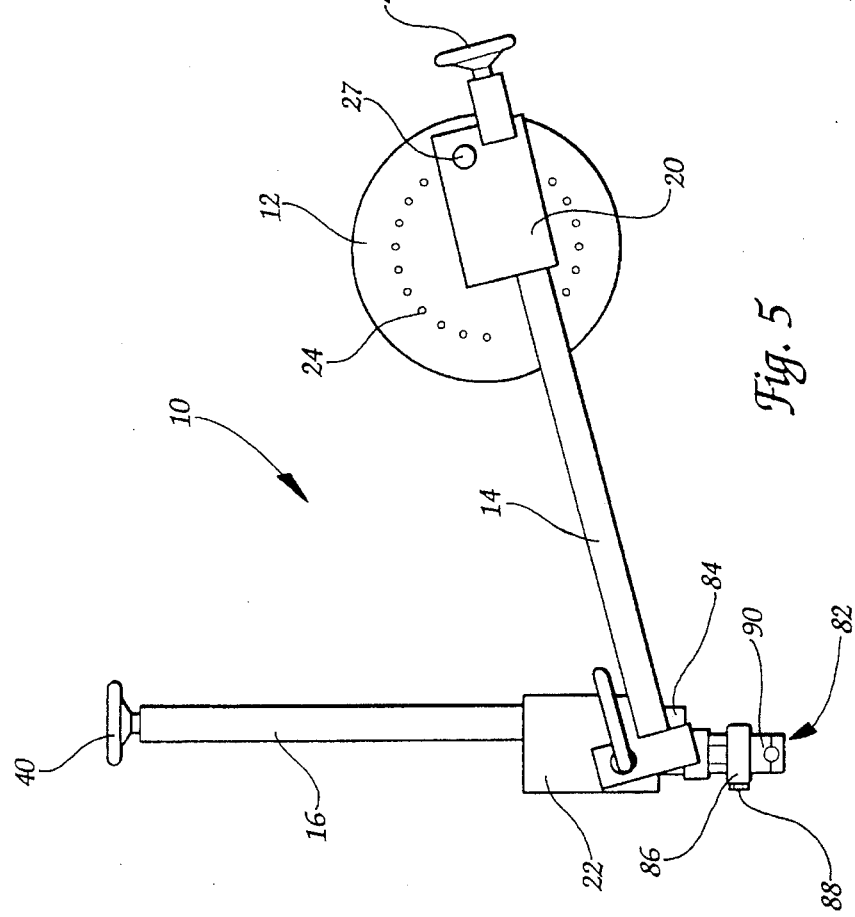

APPARATUS FOR TRACING AND MILLING MIXED RADII ARCHES

BACKGROUND OF THE INVENTION

The present invention relates broadly to apparatus for cutting, tracing, or milling arcs in a workpiece and, more particularly, to an apparatus for tracing, milling, or cutting circular or elliptical arcs with variable radii and focal distances in wood or metal.

When making door or window frames, it sometimes becomes desirable to form an archway over the window or door frame. Typically, an arc that forms an archway is not formed as a perfect half-circle but rather includes curves or multiple radii in conjunction with one another.

Typically, these arches are cut or assembled from wood. Currently, techniques for forming the arches include using a preconfigured jig, manually tracing the arc on the wood for carving or through the use of computer controlled machinery with the attendant complexity and cost. Another technique is to employ a copying machine which traces a template and a remote unit that produces the arc on the wood as a duplicate of the template.

All of the above-discussed techniques have problems. The copy machines require the production of a template while separate jigs and manual tracing are difficult operations. Further, apart from computer control, it is difficult to produce different sized arcs without substantial manual adjustment of the device in use. Further, computer-controlled machines are expensive to use and produce. The common result of all these attempts is high manufacturing costs for the archways.

SUMMARY OF THE INVENTION

It is accordingly an object of the present invention to provide an apparatus for defining arcs of mixed radii in a workpiece which requires neither templates nor computers, is simple and inexpensive in operation, and is reliable.

To that end, an apparatus for defining arcs of mixed radii in a workpiece includes a base member, a first selectively extensible arm movably mounted to the base member, and a second selectively extensible arm movably mounted to the first arm. Further, an assembly for defining an arc in a workpiece is mounted to the second arm. Additionally, an assembly is included for releasably retaining the first arm at a first disposition for selective movement of the arc defining assembly through a first predetermined angular displacement to define a first arc having a first predetermined radius. Further, an assembly is provided for releasably retaining the second arm at a second predetermined disposition for selective movement of the arc defining assembly through a second predetermined angular displacement to define a second arc having a second predetermined radius.

It is preferred that the present invention further include an assembly mounted to the base member for limiting the angular displacement of the first arm. This assembly preferably includes a plurality of openings formed in the base member and arranged in an arcuate manner, and at least one blocking pin configured for selective insertion in at least one of the openings to block movement of the first arm therepast.

The present invention preferably further includes an assembly for retaining the first arm at a first predetermined position with a second arm being movable relative to the first arm and releasably fixed at the first predetermined position.

The present invention further preferably includes an assembly for rotatably mounting the first arm to the base member including a guide support member rotatably mounted to the base member and having an opening for slidably receiving the first arm therein for selective longitudinal movement of the first arm in the guide support and selective rotary movement of the guide support member and selective tandem rotary movement of the guide support and the first arm received therein. Preferably, the present invention further includes a threaded rod attached to the first arm and threaded received in the guide support for longitudinal movement of the first arm responsive to rotation of the threaded rod. Further, the guide support may include a graduated scale for determination of a relative extended length of the first arm.

It is preferred that the present invention additionally include an assembly for rotatably mounting the second arm to the first arm, including a guide support member rotatably mounted to the first arm and having an opening for slidably receiving the second arm therein for selective longitudinal movement of the second arm in the guide support and selective tandem rotary movement of the guide support and the second arm received therein. Additionally, the present invention preferably includes a threaded rod attached to the second arm and threadably received in the guide support for longitudinal movement of the second arm responsive to rotation of the threaded rod. Additionally, the guide support member may include a graduated scale for determination of a relative extended length of the second arm.

It is preferred that the present invention include an assembly for adjusting the orientation of the arc defining assembly relative to the first arm and the second arm. The arc defining assembly is preferably selectively attachable to and removable from the second arm and may include a cutting tool for cutting an arc into the workpiece. Further, the arc defining assembly may include an instrument for drawing an arc on the workpiece.

By the above, the present invention provides an apparatus for carving, drawing or otherwise defining arcs of multiple radii in a workpiece which is simple, easy to use, and requires no template or computer to define the arc.

BRIEF DESCRIPTION OF THE DRAWINGS

FIG. 1 is a side elevational view of an apparatus for defining arcs of mixed radii on a workpiece according to the preferred embodiment of the present invention;

FIG. 2 is a top plan view of the apparatus illustrated in FIG. 1;

FIG. 3 is a front view of the apparatus illustrated in FIG. 1;

FIG. 4 is a top plan view of the apparatus illustrated in FIG. 1 providing enhanced detail as compared to FIG. 2;

FIG. 5 is a top plan view of the apparatus illustrated in FIG. 1 configured for drawing an arc on a workpiece;

FIG. 6 is a top plan view of the apparatus illustrated in FIG. 1 configured for cutting an arc in a workpiece;

DESCRIPTION OF THE PREFERRED EMBODIMENT

Figure 7:
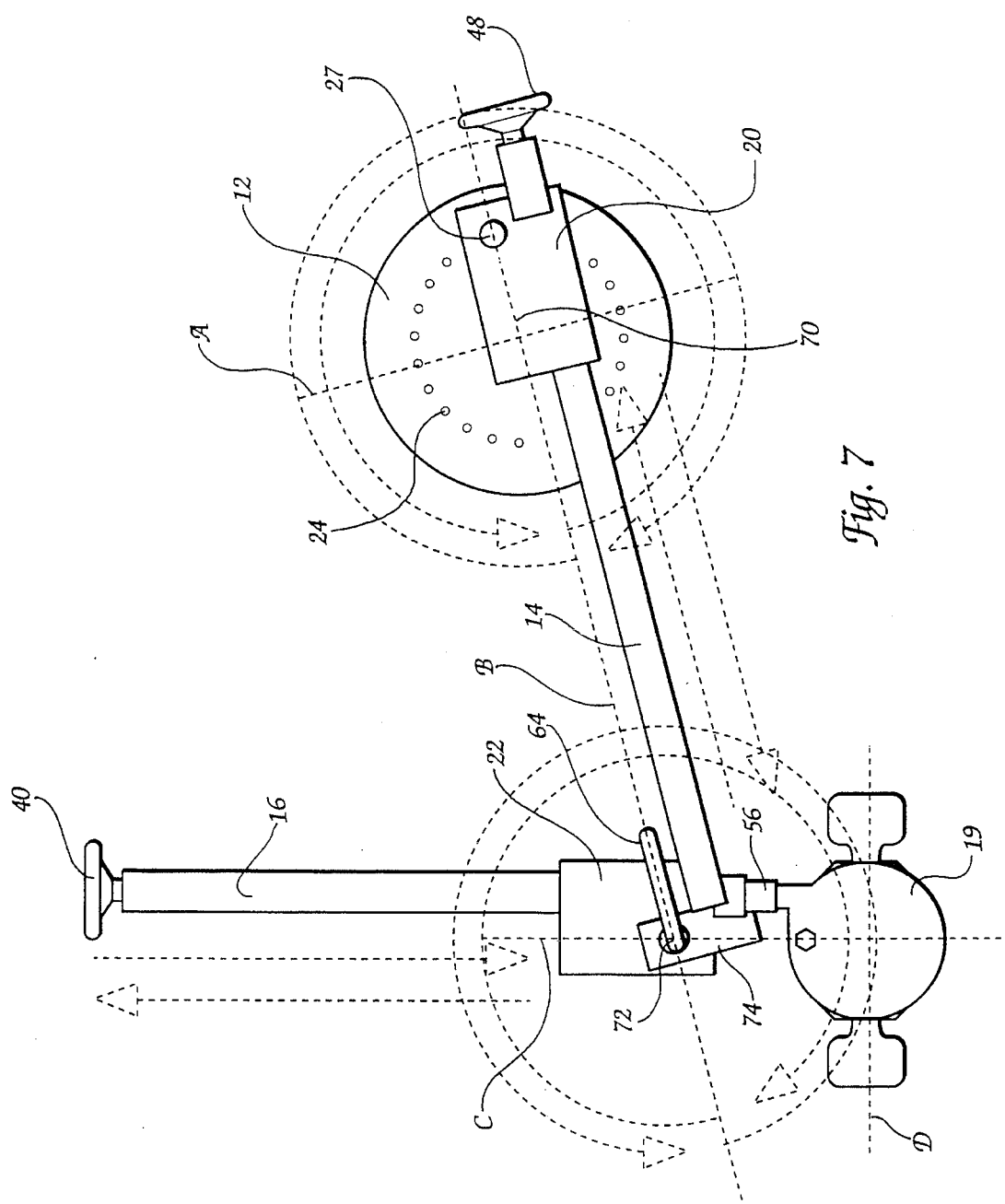
FIG. 7 is a top plan view of the apparatus in FIG. 1 illustrating possible movements of the first and second arms of the present invention.

Turning now to the drawings and, more particularly, to FIG. 1, an apparatus for tracing and milling mixed radii arches is illustrated generally at 10 and includes a first arm 14 slidably received within a generally tubular first arm guide support 20 which is in turn mounted to a generally circular base member 12 for floor support by a conventional legged frame (not shown). The first arm 14 may be selectively extended by sliding inwardly and outwardly within the guide support 20 as will be explained in greater detail hereinafter. As best seen in FIG. 4, a graduated scale 50 is provided on the first arm 14 and is used in conjunction with a cursor 42 to determine the relative extended position of the first arm 14.

Referring now to FIG. 1, a second arm 16 is slidably received within a generally tubular second arm guide support 22 which is in turn rotatably mounted to the first arm guide support 20 at a predetermined vertical spacing by a connector block 46. The second arm guide support 20 is mounted to the free end of the first arm 14 for coordinated movement therewith. The second arm 16 is provided with an assembly for selectively positioning the second arm 16. A graduated scale 52 is also formed on the second arm 16 and includes a cursor 54 for determining the relative extended length of the second arm 16.

Movement of the second arm 16 within the second guide support 22 is provided by a threaded rod 38 which is rotatably mounted to the free end of the second arm 16 and is threadedly mounted to the guide support 22. A hand wheel 40 is mounted to the threaded rod 38 adjacent the second guide support block 22. Therefore, rotation of the hand wheel 40 causes rotation of the threaded rod 38 which drives the second arm 16 inwardly and outwardly depending on the direction of rotation of the hand wheel 40. A similar apparatus, including a handwheel 48, may be provided for the first arm 14 as seen in FIG. 4. A limit member 78 physically limits sliding movement of the second arm 16 beyond a predetermined point. The first arm guide support 20 is provided with a limit member 44, controlled by a handle 60, to prevent undesired sliding movement of the first arm 14 in the first arm guide support 20. A fine adjustment assembly (not shown) is provided and is controlled by a hand dial 62.

In order to define the arcs, an arc defining assembly is attached to the distal end of the second arm 16. As illustrated in FIGS. 1–3, the arc defining assembly is a drawing unit including a mounting block 28 which is releasably attached to the second guide support 22. A pair of rods 34 projects outwardly from the drawing unit mounting block 28 in a generally parallel manner. A drawing pen 30 is mounted to a pen support 32 which is in turn slidably mounted to the aforesaid parallel rods 34. The drawing pen 30 projects downwardly from the pin mounting block 32 in a vertical orientation sufficient to contact the workpiece. The pen mounting block 32 is two-piece unit which is held together by a threaded rod (not shown) having an adjustment knob 36 mounted thereto. By tightening the rod using the knob 36, the two pieces of the pen mounting block 32 are drawn together with the parallel rods 34 fixedly held therebetween.

As seen in FIGS. 4 and 6, the arc defining assembly may be a router 19 which is mounted to the distal end of the second arm 16 with a mounting assembly 56.

With continued reference to FIG. 4, since the second arm guide support 22 is pivotally mounted to the first arm 14, a support 74 is provided to retain the second arm guide support 22 against the first arm. The relative pivotal location of the second arm 16 is maintained using a rotating stop lever unit 64 which is a generally elongate handle. The relative rotational position of the second arm 16 with respect to the first arm 14 is fixed using a rotatable tensioning arrangement (not shown) and an adjustment wheel 80. Further, a similar arrangement (not shown) is provided to arrest the sliding movement of the second arm 16 in the second arm guide support 22 using an adjustment wheel 76.

The relative alignment of the first arm 14 and the second arm 16 is illustrated in FIG. 4 using dotted lines A,B,C,D. A pivotal axis for the first arm is indicated at 70 and lies at the intersection of and is orthogonal to broken lines A and B. Further, the second arm is pivotal about a pivot axis indicated generally at 72 that lies at the intersection of and is orthogonal to broken lines B and C. It should be noted that the first arm 14 is offset a predetermined distance from broken line B which connects the pivot axes of the first arm guide support 20 and the second arm guide support 22. The second arm 16 is also offset from the broken line C. The broken line C indicates the general alignment of the second guide support 22 pivot point 72 and the cutting tool center represented by the intersection of broken lines D and C. An alignment opening 68 is provided in the second arm guide support 22 for visually acquiring position information regarding the centerline of the arc defining assembly along broken line C.

In order to fix the first arm 14 in position, a plurality of openings 24 are formed in the base member 12. A corresponding opening (not shown) is formed in the first arm guide support 20. A limit pin 27, configured for insertion into the openings 24 extends through the opening in the first arm guide support 20 for receipt within a selected opening 24. When the desired angular orientation of the first arm 16 is obtained, the limit pin 27 is inserted into the opening in the first arm guide support 20 which should be in registry with one of the openings 24 formed in the base member 12. The limit pin 27 may therefore be inserted in the desired opening 24 to prevent further rotation of the first arm support 20. Further, and as seen in FIG. 4, a mechanical stop element 26 may be positioned with one of the openings 24 to define a limit of rotation of the first arm support 20.

FIGS. 5 and 6 illustrate the apparatus 10 of the present invention with a second type of drawing unit 82 and a router 19, mounted to the second arm 16, respectively. With reference to FIG. 5, the drawing unit 82 includes a slide support 86 for lateral movement controlled by a hand dial 88. The drawing pen 30 is mounted to the slide support 86 by a two-piece mounting block 90. The entire drawing unit 82 is mounted to the second arm guide support 22 using a quick release assembly 84. For cutting, and as seen in FIG. 6, a router 19 is mounted to the second-arm 16 using a quick release assembly 56.

Operation of the present invention is best seen with reference to FIGS. 7–13. In FIG. 7, broken arrows indicate relative movement, both liner and rotational, of the first and second arms 14,16. It should be noted that while FIGS. 7–13 disclose use of the present invention with a router 19, the above-described drawing instrument may be used as well as a cutting torch (not shown) or any other apparatus which can define an arc on a workpiece.

Figure 8:
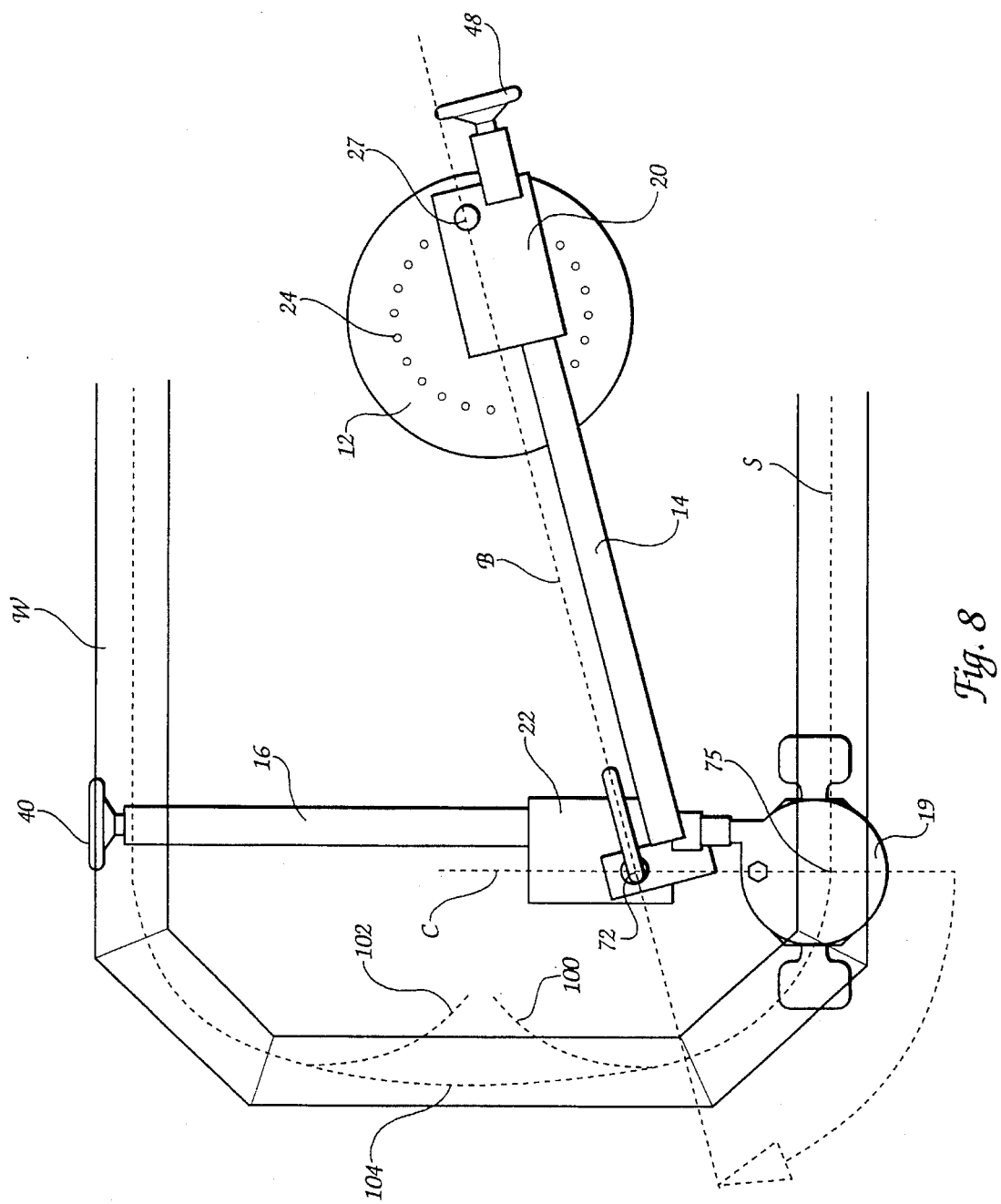
FIGS. 8, 9, 10, 11, 12 and 13 illustrate the progressive steps of forming arcs of mixed radii in a workpiece using the apparatus illustrated in FIG. 7.

Referring now to FIGS. 8–13, a workpiece W is illustrated and includes five straight members oriented to form a generally arcuate structure. A smooth arc is defined thereon and indicated by broken lines generally at S. To form the composite arcs, three subarcs are contemplated, including two minor subarcs identified by broken lines 100,102, and a major subarc indicated by broken line 104. The minor subarcs 100,102 include a radius extending from the center 75 of the router 19 to the pivot point 72 of the second arm 16. In order to form the first minor subarc 100, the first arm 14 is extended to a predetermined length by rotating handwheel 48. Rotation of handwheel 48 will bring the first arm 14 to a position wherein the pivot point 72 of second arm 16 is in alignment with the starting position of the first minor subarc 100 as indicated by broken line C in FIG. 8. The locking pin 27 is used in a manner previously described to lock the first arm 14 in position for cutting the first minor subarc 100. Next, the second arm 16 is caused to move by rotation of the second arm handwheel 40 and is extended to a position wherein the center point 75 of the router 19 is coincident with the starting point of the second minor subarc 102. This situation is illustrated in FIG. 8.

Figure 9:
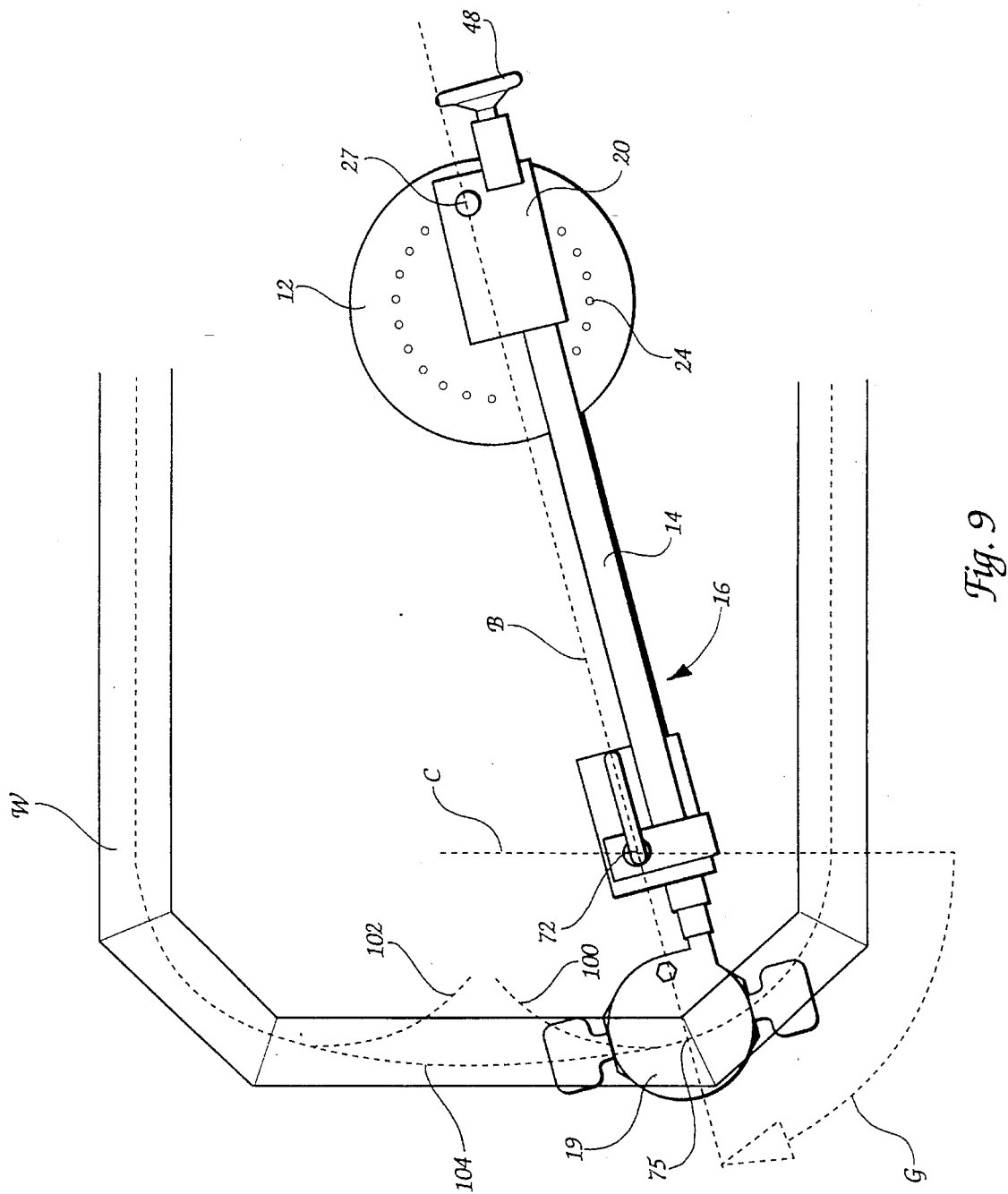

Turning to FIG. 9, the first minor subarc 100 is formed by sweeping the second arm 16 through an arcuate movement which in turns moves the router 19 through an arc indicated by broken arrow G in FIG. 9. Activation of the router 19 will cause the router 19 to carve the first minor subarc 100 as the router 19 is swept through the arc indicated by broken arrow G. When the first minor subarc 100 is complete, the second arm 16 should be aligned with the first arm 14 as indicated in FIG. 9, which, as seen presently, defines the starting point for the major subarc 104.

Figure 10:
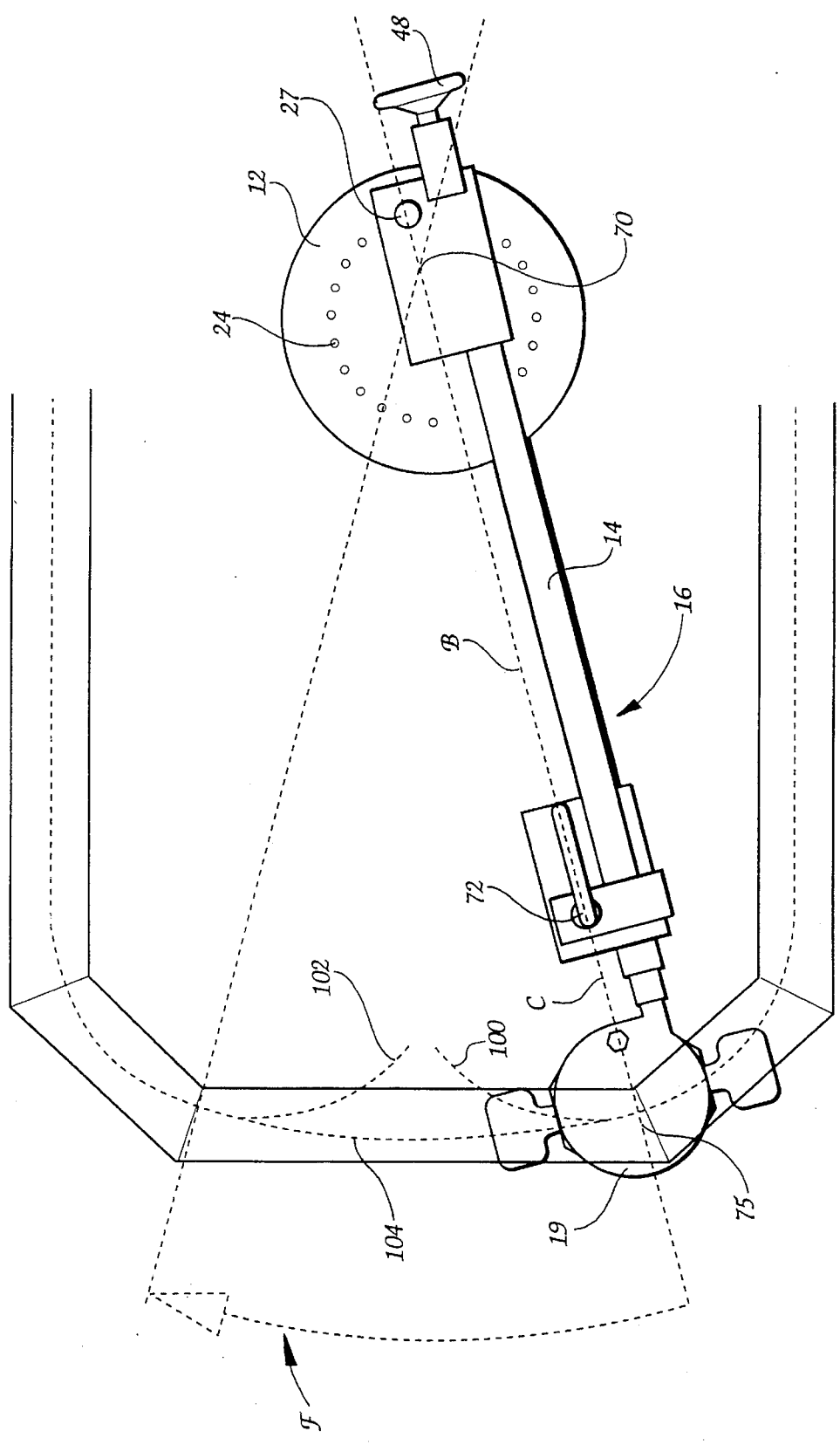
Figure 11:
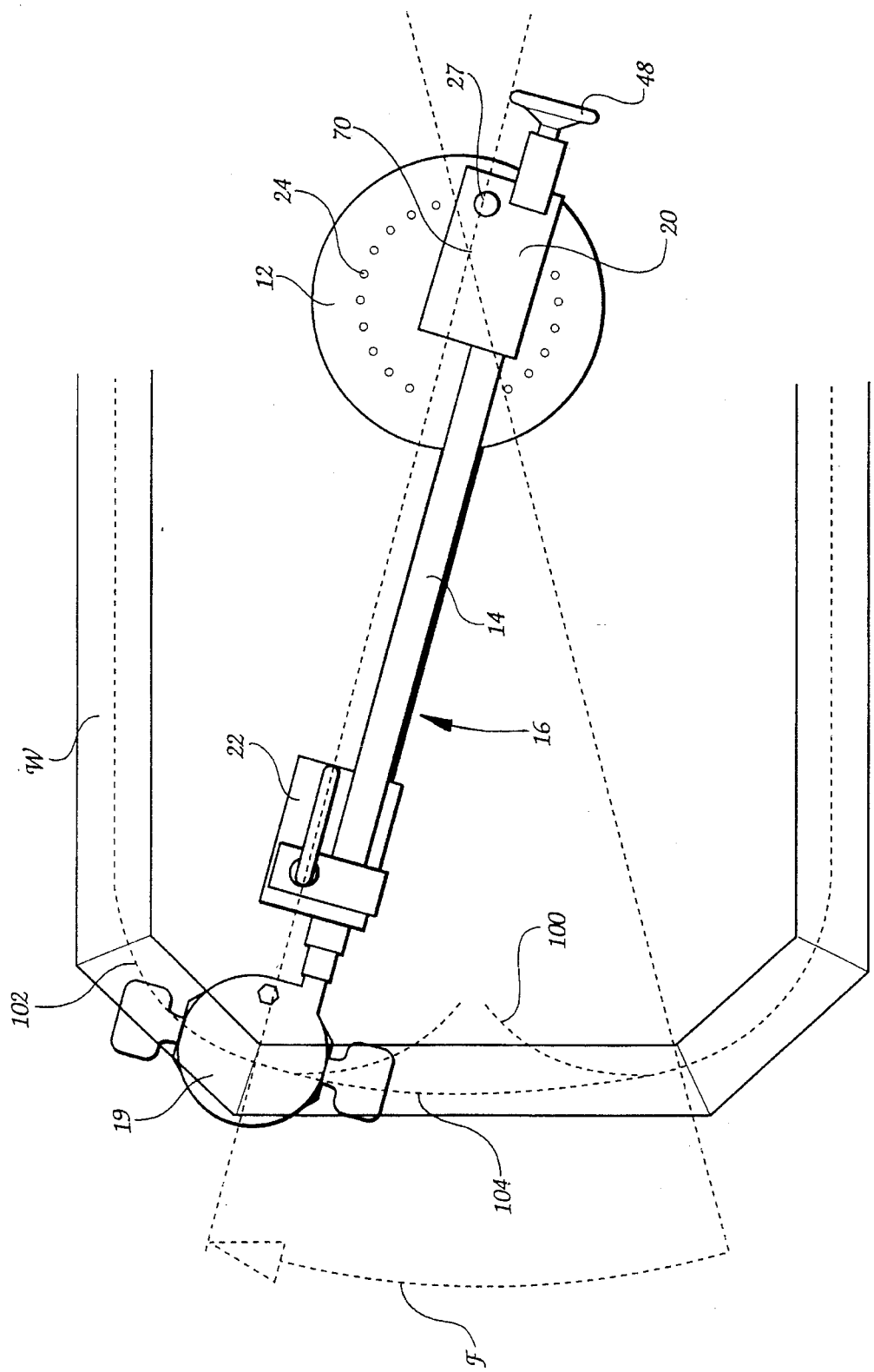
Figure 12:
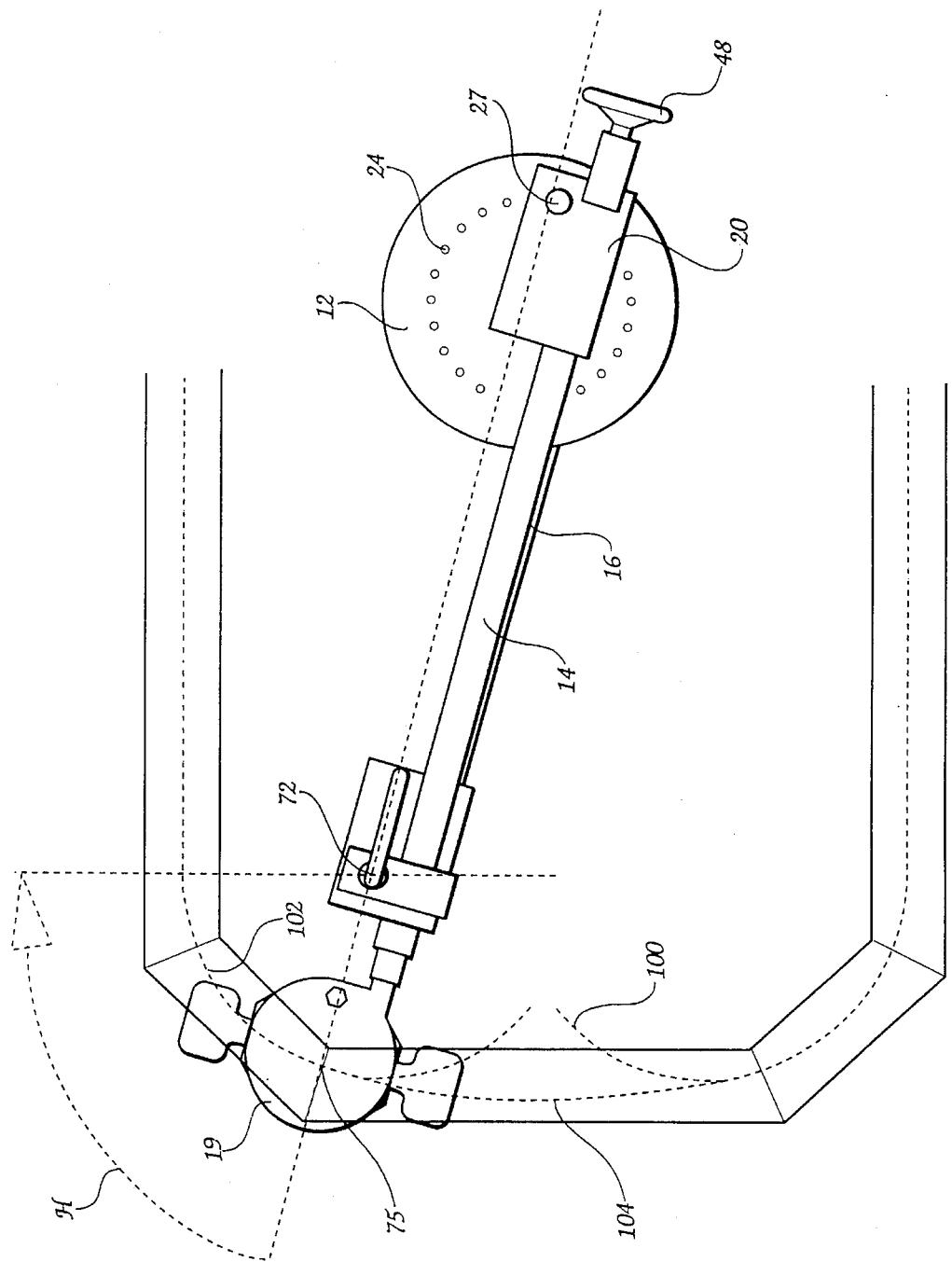

Next, the major subarc 104 is formed. It should be noted that no further movement of the second arm 16 relative to the first arm 14 is contemplated for forming the major subarc 104. As seen in FIG. 10, the broken line parallel B with the first arm 14 is now coincident with the broken line C which was formerly associated with the second arm 16. The major subarc 104 has a radius equal to the distance between the first arm pivot point 70 and the center 75 of the router 19 which extends through the second arm pivot point 72. With the second arm 16 fixed in position, the locking pin 27 is removed from the selected opening 24 and the first arm 14 is pivoted about its pivot point 70 with the router 19 activated through an arc defined by broken arrow F to define the major subarc 104. Once the router 19 has been moved through the major subarc 104, as seen in FIG. 11, the locking pin 27 is reinserted in the first arm guide support 20 to retain the first arm 14 at this position.

Figure 13:
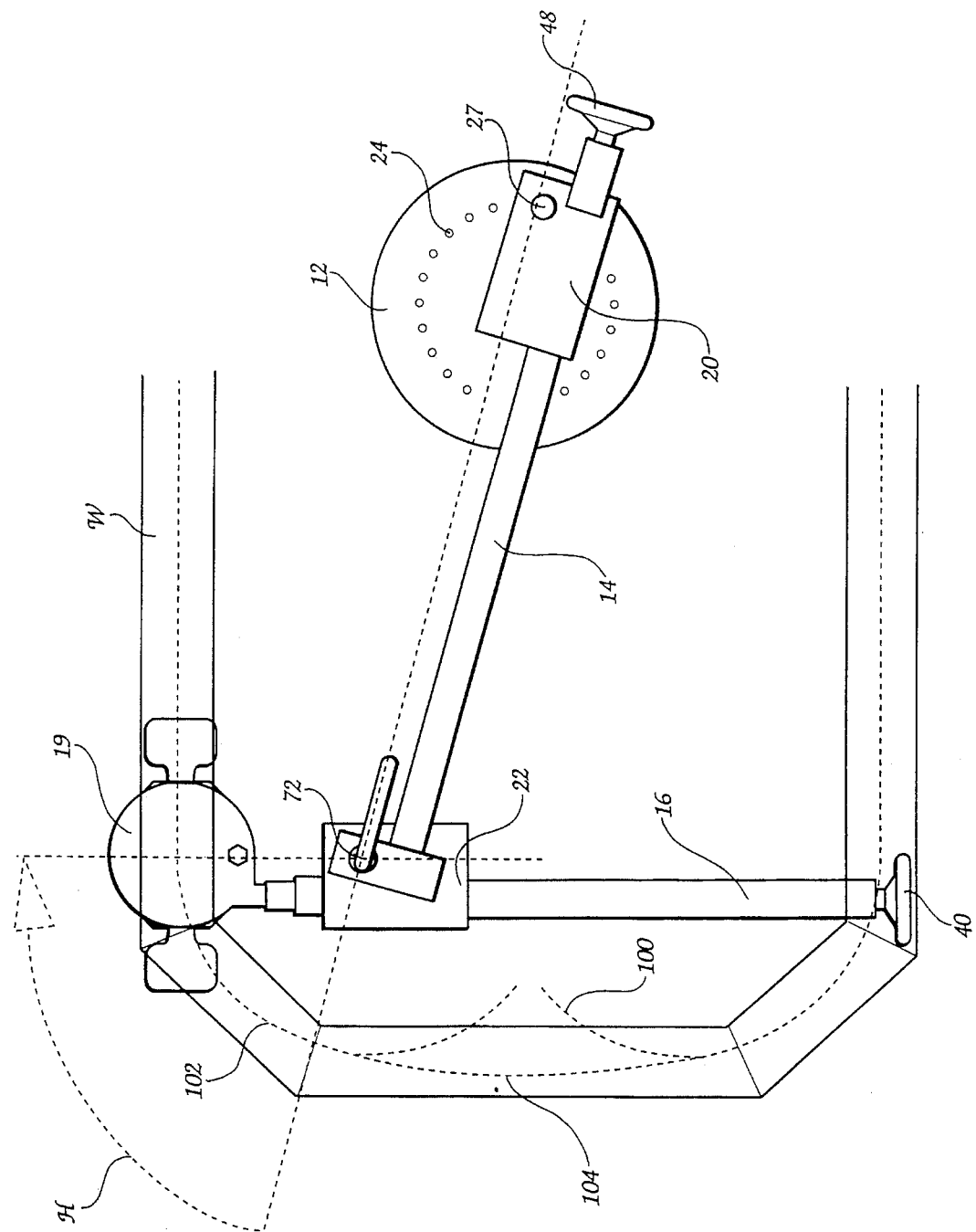

Next, the second minor subarc 102 is formed in a manner similar to the formation of the first minor subarc 100. With the first arm 14 locked into position, the second arm 16 is released and with the router 19 activated, the second arm 16 is pivoted about its pivot point 72 causing the router 19 to trace through an arc indicated by broken arrow H. The final position of the router 19 is illustrated in FIG. 13. By the above process, an arc of mixed radii has been defined in the workpiece. In order to form the complete arc, the first arm is extended or withdrawn a predetermined amount which will correspond with the width of the archway to be formed. The above discussed process is then repeated to define a second mixed radii composite arc which is a predetermined distance away from the first complete arc which will provide an archway having a smooth curvature and a constant width.

By the above, the present invention provides a simple, mechanically oriented device which will provide smooth archways having constant, mixed radii and constant width. While the above discussion of operation was directed to use with a router, it should be noted that the aforesaid drawing instrument could be used as well as a cutting torch to form the arch from metal.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for defining arcs of mixed radii on a workpiece comprising:

a base member;

a first selectively extensible arm movably mounted to said base member;

a second selectively extensible arm movably mounted to said first arm;

means for defining an arc on a workpiece mounted to said second arm;

means for releasably retaining said first arm at a first disposition for selective movement of said arc defining means through a first predetermined angular displacement to define a first arc having a first predetermined radius;

means for releasably retaining said second arm at a second predetermined disposition for selective movement of said arc defining means through a second predetermined angular displacement to define a second arc having a second predetermined radius.

2. The apparatus according to claim 1 and further comprising means for retaining said first arm at a first predetermined position with said second arm being movable relative to said first arm releasably fixed at said first predetermined position.

3. The apparatus according to claim 1 and further comprising means mounted to said base member for limiting the angular displacement of said first arm.

4. The apparatus according to claim 3 wherein said limiting means includes a plurality of openings formed in said base member and arranged in an arcuate manner and at least one blocking pin configured for selective insertion in at least one of said openings to block movement of said first arm therepast.

5. The apparatus according to claim 1 and further comprising means for rotatably mounting said first arm to said base member including a guide support member rotatably mounted to said base member and having an opening for slidably receiving said first arm therein for selective longitudinal movement of said first arm in said guide support member and selective tandem rotary movement of said guide support and said first arm received therein.

6. The apparatus according to claim 5 and further comprising a threaded rod attached to said first arm and threadably received in said guide support for longitudinal movement of said first arm responsive to rotation of said threaded rod.

7. The apparatus according to claim 6 wherein said guide support member includes a graduated scale for determination of a relative extended length of said first arm.

8. The apparatus according to claim 1 and further comprising means for rotatably mounting said second arm to said first arm including a guide support member rotatably mounted to said first arm and having an opening for slidably receiving said second arm therein for selective longitudinal movement of said second arm in said guide support member and selective tandem rotary movement of said guide support and said second arm received therein.

9. The apparatus according to claim 8 and further comprising a threaded rod attached to said second arm and threadably received in said guide support for longitudinal movement of said second arm responsive to rotation of said threaded rod.

10. The apparatus according to claim 9 wherein said guide support member includes a graduated scale for determination of a relative extended length of said second arm.

11. The apparatus according to claim 1 and further comprising means for adjusting the orientation of said arc defining means relative to said first arm and said second arm.

12. The apparatus according to claim 1 wherein said arc defining means is selectively attachable to and removable from said second arm.

13. The apparatus according to claim 12 wherein said arc defining means includes a cutting tool for cutting an arc into the workpiece.

14. The apparatus according to claim 12 wherein said arc defining means includes an instrument for drawing an arc on the workpiece.

* * * * *

UNITED STATES PATENT AND TRADEMARK OFFICE
CERTIFICATE OF CORRECTION

PATENT NO. : 5,494,384
DATED : February 27, 1996
INVENTOR(S) : Gianfranco Pozzo

It is certified that error appears in the above-indentified patent and that said Letters Patent is hereby corrected as shown below:

Title page, item [19] inventors: should read-- Pozzo--.
             [75] inventors: should read --Gianfranco Pozzp--.

Signed and Sealed this

Eleventh Day of March, 1997

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO.   : 5,494,384

DATED       : February 27, 1996

INVENTOR(S) : Gianfranco Pozzo

It is certified that error appears in the above-identified patent and that said Letters Patent is hereby corrected as shown below:

Title page, item [19] inventors: should read -- Pozzo--.
            [75] inventors: should read --Gianfranco Pozzo--.

This certificate supersedes Certificate of Correction issued March 11, 1997.

Signed and Sealed this

Twentieth Day of May, 1997

*Attest:*

BRUCE LEHMAN

*Attesting Officer*      *Commissioner of Patents and Trademarks*